UNITED STATES PATENT OFFICE.

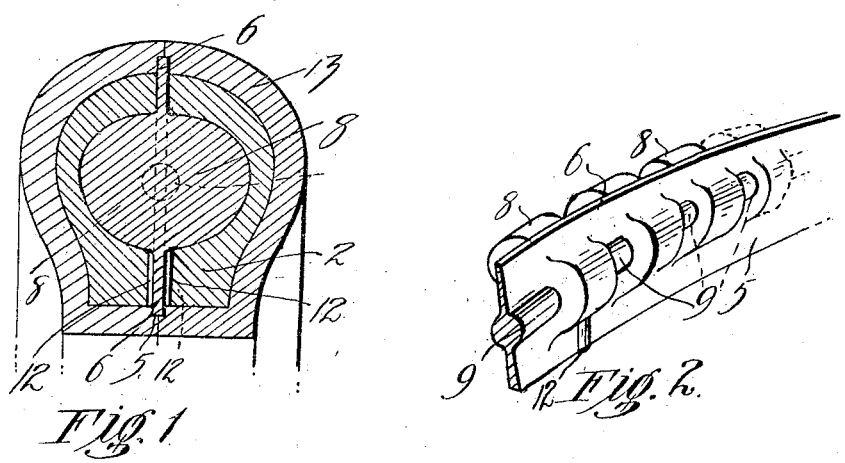
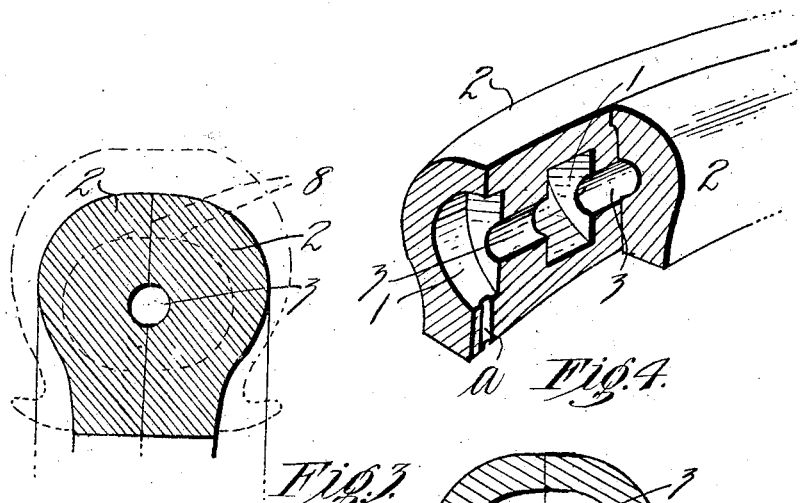

ANDERS JOHN OSTBERG AND ALBERT KENNY, OF RICHMOND, NEAR MELBOURNE, VICTORIA, AUSTRALIA, ASSIGNORS TO THE STANDARD RUBBER WORKS PROPRIETARY LIMITED, OF MELBOURNE, AUSTRALIA, A CORPORATION OF VICTORIA.

RESILIENT TIRE.

1,411,506.   Specification of Letters Patent.   Patented Apr. 4, 1922.

Application filed August 18, 1920. Serial No. 404,339.

*To all whom it may concern:*

Be it known that ANDERS JOHN OSTBERG and ALBERT KENNY, citizens of the Commonwealth of Australia, and residents of Richmond, near Melbourne, in the State of Victoria and said Commonwealth, have invented certain new and useful Improvements in and Relating to Resilient Tires, of which the following is a specification:—

This invention relates to improvements in and relating to resilient tires and has been devised in order to provide improvements which are more particularly applicable to resilient tires having internal cells or air spaces.

The invention is characterized by the formation between the cells of an air passage, the cells and their connecting passages being disposed centrally of the core which may be adapted to either form an increased resilient member or element in a solid resilient tire, or which may be utilized as the medium for allowing of the circulation of compressed air through the recesses of the tire by means of a valve connection and pump so as to provide semi-pneumatic means combined with the ordinary tire of substantially solid construction.

In order that the invention may be more readily understood it will now be described with reference to the accompanying drawings in which:—

Figure 1 is a view in transverse section of a tire constructed according to this invention.

Figure 2 is a view in perspective of the inner mould embodied in the invention.

Figure 3 is a view in transverse section illustrating the completed inner resilient core of the tire, and Figure 4 is a perspective view showing the completed inner core partly in section.

Figure 5 is a view in transverse section through one of the air cells.

According to this invention, air cells 1 are arranged within and spaced around a base or core 2, the circular pathway 3 forming a connection or pathway to all the cells 1 in the tire and they may be moulded so as to form the ordinary solidly constructed resilient tire. A valve 4 may be fitted communicating with one of the cells 1 to allow of the pumping of air into the said cell and by means of the pathway 3 to all the cells of the core 2.

An essential characteristic of the formation of a resilient tire in this way allows, during the vulcanization, of the ingress of steam through a single orifice $a$ leading to the air cells and to the continuous pathway 3 above described.

One means of carrying the invention into practical effect consists in the utilization of a mould plate 5, so that the core 2 may be completely divided, while a flange or extension 6 extends at the top and bottom of the plate 5 through the core and this inner mould plate is provided with protuberances 8 on either side spaced around the same to provide the air cells 1 and is shaped as at 9 between the protuberances 8 to allow of the formation of the passages 3 above described. The outer mould 13 within which the core 2 and inner mould 5 are placed is formed in two halves while a hole $a$ or holes is or are provided extending into the periphery of the core 2 from one of the cells to allow of the ingress of steam during the vulcanizing process, the hole $a$ being formed by the ridges 12 on the inner mould 5.

In the method of construction, the material to form the core 2 is placed in the moulds 5 and 10 and then vulcanized. After the vulcanization, the outer mould 10 is removed, leaving the resilient core upon the inner mould 5 and the core by this method is divided centrally from the inner surface to the outer surface or to near the outer surface as desired.

It will be obvious that the inner mould may also be formed in two halves if so desired. By spreading the two sides of the core, it can be easily removed or stretched from the inner mould or moulds and the resilient core is then completed by combining the split or divided cores by vulcanizing or by adhesive solution, thus providing a resilient rubber core having spaced airtight cells or chambers 1, each connecting each other by the continuous central recess 3.

The core is then arranged within an outer cover in which case the bottom of the core and its cover being necessarily wider than the wheel rims they are pressed or pinched into position and are rigidly held in the wheel rim. Alternatively, in the process of manufacture, the core 2 may be vulcanized to the said cover. During the final vulcanization a valve 4 may be fitted in the passage or hole $a$ to communicate with the centrally disposed pathway and cells to allow air to be introduced into the pathway and cells after fitting the tire to the wheel and so combine a resilient tire with means for enabling it to be utilized as a semi-pneumatic tire.

We desire it to be understood that various modifications may be embodied without departing from the spirit and scope of the invention as defined by the appended claim, the essential element being the combining of the spaced air cells and the connecting pathways which are capable of being utilized in the manner above described.

What we claim as our invention and desire to secure by Letters Patent is—

An improved resilient tire, comprising the combination of an inner resilient core and an outer casing, the core being divided into two parts along a central vertical plane and formed with spaced air cells, said air cells being interconnected by passages extending longitudinally and centrally of the core, there being one such passage only between each adjacent pair of air cells, and said air cells being of substantially elliptical cross-section and entirely surrounded peripherally by the solid material of the core.

Signed at Melbourne in the State of Victoria, and Commonwealth of Australia, this 30th day of June A. D. 1920.

ANDERS JOHN OSTBERG.
ALBERT KENNY.

Witnesses:
SIDNEY HENDLEY,
A. EAWORD.